(12) United States Patent
Burns et al.

(10) Patent No.: US 7,531,479 B2
(45) Date of Patent: May 12, 2009

(54) CATALYTICALLY ACTIVE COATING AND METHOD OF DEPOSITING ON A SUBSTRATE

(75) Inventors: Andrew Jeremiah Burns, Orlando, FL (US); Ramesh Subramanian, Oviedo, FL (US); Vasudevan Srinivasan, Winter Springs, FL (US)

(73) Assignee: Siemens Energy, Inc., Orlando, FL (US)

( * ) Notice: Subject to any disclaimer, the term of this patent is extended or adjusted under 35 U.S.C. 154(b) by 857 days.

(21) Appl. No.: 10/839,090

(22) Filed: May 5, 2004

(65) Prior Publication Data

US 2005/0250643 A1    Nov. 10, 2005

(51) Int. Cl.
  *B01J 23/00*  (2006.01)
  *B01J 23/40*  (2006.01)
  *B01J 23/42*  (2006.01)
  *B01J 23/44*  (2006.01)
  *B01J 21/04*  (2006.01)

(52) U.S. Cl. .............. 502/302; 502/326; 502/327; 502/332; 502/333; 502/334; 502/339; 502/349; 502/355; 502/439; 502/527.12; 502/527.13

(58) Field of Classification Search .......... 502/302, 502/326, 327, 332, 333, 334, 339, 349, 355, 502/415, 439, 527.12, 527.13
See application file for complete search history.

(56) References Cited

U.S. PATENT DOCUMENTS

| | | |
|---|---|---|
| 4,603,547 A | 8/1986 | Pfefferle et al. |
| 4,870,824 A | 10/1989 | Young et al. |
| 5,047,381 A | 9/1991 | Beebe |
| 5,258,349 A | 11/1993 | Dalla Betta et al. |
| 5,355,668 A | 10/1994 | Weil et al. |
| 5,460,002 A | 10/1995 | Correa |
| 5,511,972 A | 4/1996 | Dalla Betta et al. |
| 5,942,334 A | 8/1999 | Wortman |
| 5,946,917 A | 9/1999 | Hums et al. |
| 5,987,882 A * | 11/1999 | Voss et al. ............ 60/274 |
| 6,006,516 A * | 12/1999 | Voss et al. ............ 60/299 |
| 6,015,285 A | 1/2000 | McCarty et al. |
| 6,203,927 B1 | 3/2001 | Subramanian et al. |
| 6,234,755 B1 | 5/2001 | Bunker et al. |
| 6,256,984 B1 * | 7/2001 | Voss et al. ............ 60/299 |
| 6,269,625 B1 | 8/2001 | Dibble et al. |
| 6,270,336 B1 | 8/2001 | Terashima et al. |

(Continued)

Primary Examiner—Cam N. Nguyen

(57) ABSTRACT

A method of depositing a catalytically reactive coating to a substrate including selecting a target light off temperature for a predetermined catalytic combustion environment, selecting a thermal barrier coating composition, selecting a catalytic material and codepositing the thermal barrier coating composition and the catalytic material onto the substrate in proportions selected to produce the target light off temperature when exposed to the combustion environment. The method may include controlling the codepositing step to cause the thermal barrier coating composition to interact with the catalytic material to produce a phase having a light off temperature different from the respective light off temperatures of the thermal barrier coating composition and the catalytic material. A catalyst element may include a substrate and a first layer comprising a thermal barrier coating composition and a catalytic material throughout its depth disposed over a first portion of the substrate. Other portions of the catalyst element may have a second layer consisting of a catalytic material and a third layer consisting of a thermal barrier coating composition depending on a stage of combustion with a combustion environment.

18 Claims, 2 Drawing Sheets

U.S. PATENT DOCUMENTS

| | | | |
|---|---|---|---|
| 6,322,889 B1 | 11/2001 | Lara-Curzio et al. | |
| 6,358,879 B1 | 3/2002 | Pfefferle et al. | |
| 6,422,008 B2 * | 7/2002 | Voss et al. | 60/299 |
| 6,617,049 B2 | 9/2003 | Darolia et al. | |
| 6,627,323 B2 | 9/2003 | Nagaraj et al. | |
| 6,652,987 B2 | 11/2003 | Allen et al. | |
| 6,720,038 B2 | 4/2004 | Darolia et al. | |
| 7,371,352 B2 * | 5/2008 | Campbell et al. | 422/177 |
| 2001/0049936 A1 * | 12/2001 | Kenneth et al. | 60/299 |
| 2002/0055004 A1 | 5/2002 | Walston et al. | |
| 2002/0094448 A1 | 7/2002 | Rigney et al. | |
| 2002/0102360 A1 | 8/2002 | Subramanian et al. | |
| 2003/0021905 A1 | 1/2003 | Lee et al. | |
| 2003/0034246 A1 | 2/2003 | Liu et al. | |
| 2003/0056520 A1 | 3/2003 | Campbell et al. | |
| 2003/0103875 A1 | 6/2003 | Campbell et al. | |

* cited by examiner

CATALYTICALLY ACTIVE COATING AND METHOD OF DEPOSITING ON A SUBSTRATE

FIELD OF THE INVENTION

This invention relates generally to the field of gas turbines having a catalytic combustor and in particular to a catalytically active coating and method of depositing on a substrate.

BACKGROUND OF THE INVENTION

In the operation of a conventional gas turbine, intake air from the atmosphere is compressed, heated by a compressor and caused to flow to a combustor where fuel is mixed with the compressed air and the mixture is ignited and burned. The heat energy thus released then flows in the combustion gases to the turbine where it is converted into rotary mechanical energy for driving equipment, such as for generating electrical power or for running an industrial process. Use of a combustion catalyst in the combustion zone is known to promote complete combustion of lean premixed fuels and thereby minimize undesirable emissions. Typical combustion catalysts for a hydrocarbon fuel-oxygen reaction include platinum, palladium, rhodium, iridium, terbium-cerium-thorium, ruthenium, osmium and oxides of chromium, iron, cobalt, lanthanum, nickel, magnesium and copper, for example.

Noble elements such as platinum or palladium are commonly used catalytic combustion surfaces in a catalytic combustor of a gas turbine. However, such noble elements may not be sufficiently durable above certain temperatures and may not offer sufficient insulating properties to protect a metallic substrate from elevated temperature attack such as corrosion or oxidation. Further, wash coats of catalytic materials can erode, spall or otherwise wear away from an underlying thermal barrier coating or substrate over time and the catalytic material may become deactivated. These events lead to inefficient combustion and typically require new coatings or maintenance.

U.S. Patent Application Publication U.S. 2003/0056520 A1, which is specifically incorporated herein by reference, discloses a catalyst element that includes a substrate, a thermal barrier coating disposed over the substrate and a combustion catalyst disposed over the thermal barrier coating. A ceramic wash-coat may be disposed between the thermal barrier coating and the catalyst. In order to obtain a desired more turbulent flow of fuel-air mixture, the thermal barrier coating surface has at least one feature suitable to interdict the flow and cause the flow to become more turbulent than if such feature did not exist.

BRIEF DESCRIPTION OF THE DRAWINGS

These and other advantages of the invention will be more apparent from the following description in view of the drawings that show.

DETAILED DESCRIPTION OF THE INVENTION

Figure 1:
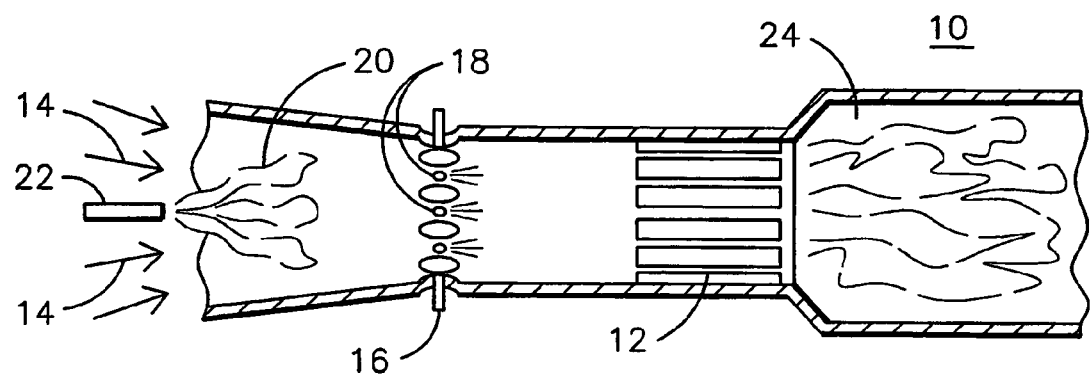
FIG. 1 is an exemplary cross section of a prior art combustor.

FIG. 1 illustrates an exemplary gas turbine combustor 10 wherein at least a portion of the combustion may take place in a catalytic reactor 12. Such a combustor 10 may be part of a combustion turbine apparatus such one used to power an electrical generator or a manufacturing process. Compressed air 14 from a compressor (not shown) may be mixed with a combustible fuel 16 by a fuel-air mixing device such as fuel injectors 18 at a location upstream of the catalytic reactor 12. Catalytically active materials present on surfaces of the catalytic reactor 12 may react the fuel-air mixture at temperatures lower than normal ignition temperatures. Certain catalyst materials may not be active at the compressor discharge supply temperature for certain fuels, fuel mixtures and engine designs, such as natural gas lean combustion. Accordingly, a preheat burner 20 may be provided to preheat the combustion air 14 by combusting a supply of preheat fuel 22 upstream of the main fuel injectors 18. A portion of the fuel may be reacted on the catalyst surface with the remaining combustion occurring downstream in the burnout region 24.

The operating environment of a gas turbine is very hostile to metallic substrates such as those formed of nickel and cobalt-base superalloys. Such alloys alone are often inadequate for making components located in certain high temperature sections of a gas turbine such as the turbine and combustor. A common solution is to thermally insulate such components in order to minimize their service temperatures. In this respect, thermal barrier coatings (TBC) may be deposited on the outer surfaces of such components. An exemplary TBC composition is yttria-stabilized zirconia (YSZ), which may be deposited by electron beam physical vapor deposition (EB-PVD). The EB-PVD process may provide the YSZ coating with a columnar microstructure having sub-micron sized gaps between adjacent columns of YSZ material. Alternatively, the YSZ may be applied by air plasma spraying (APS), which will not typically provide a columnar microstructure but will create a series of splats separated by interlamellar cracking and porosity. Alternate chemistries of TBC composition and methods of deposition will be recognized by those skilled in the art and may be used in accordance with aspects of the invention. It will be appreciated that a stand-alone layer of a TBC composition may be suitable for high temperature catalytic combustion; however, as used herein, a TBC composition is typically selected for its thermal barrier properties and may be codeposited with a catalytically active material to achieve uniquely tailored light off temperatures. The light off temperature of a deposited material may be the minimum temperature at which catalytic combustion is initiated with respect to that material in a combustion environment or when exothermic activity can be measured.

A gas turbine combustor, such as combustor 10, may include more than one zone or stage of combustion as fuel travels from fuel injectors 18 toward burnout region 24. For example, in an exemplary combustor 10 fuel may be catalytically combusted within different temperature ranges or stages. A first stage temperature range may be between about room temperature up to 500° C., a second stage between about 500° C. and 800° C. and a third stage of about 800° and higher. In accordance with aspects of the invention, catalytically active materials may be deposited on various portions of a substrate's surface, such as a surface of combustor 10 or other such catalyst elements, to achieve uniquely tailored light off temperatures with respect to one or more stages of combustion. In this respect, a stage of combustion may be defined over a longitudinal segment or length of combustor 10 having a respective coating deposited thereon. As fuel moves over the length of combustor 10 it may react with various catalytic material deposited thereon to maximize the efficiency of the catalytic combustion process. It will be appreciated that the stages of combustion described herein are for ease of illustration. A combustion process may catalytically combust fuel in accordance with aspects of the invention regardless of the specific geometry of the combustor or surfaces on which material is deposited or whether the stages of combustion are discrete or blended together such as where a portion of one stage overlays or intersects with a portion of another stage.

Figure 2:
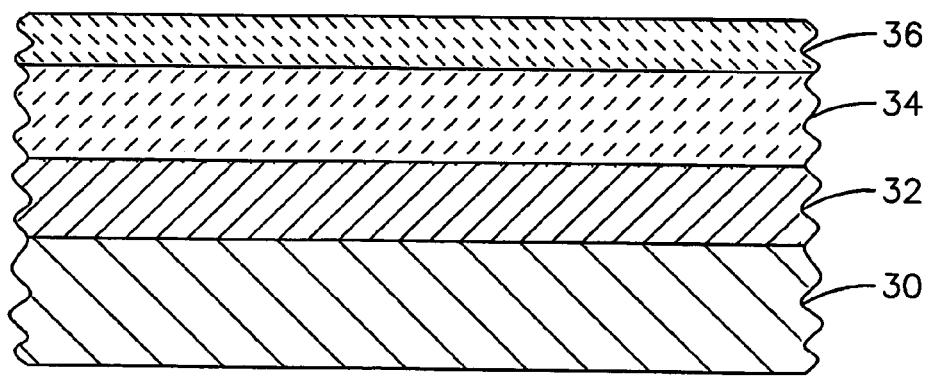
FIG. 2 is a cross sectional fragmented view of a substrate and exemplary coating.

FIG. 2 illustrates a cross-section of an exemplary coating system 29 deposited on a substrate 30 that may be fabricated of a superalloy metal or ceramic. System 29 and substrate 30 may form a portion of a component in a gas turbine, such as a component used in catalytic reactor 12 of combustor 10. Bond coat layer 32 may be deposited on substrate 30 using conventional thermal deposition or spray processes. In alternate embodiments bond coat layer 32 may be omitted or may be integral with the substrate 30, i.e., formed as part of the substrate itself. In combustion turbine applications bond coat layer 32 may typically be an MCrAlY layer deposited by a variety of conventional techniques such as EB-PVD, chemical vapor deposition, plasma vapor deposition, sputtering, low pressure plasma spray or a thermal spray process. Examples of thermal spray processes are vacuum plasma deposition, high velocity oxy-fuel (HVOF), or APS. Combinations of thermal spray and CVD techniques may also be employed. As is known in the art, the "M" in this formulation may represent iron, nickel or cobalt, or a mixture thereof. Alternatively, bond coat layer 32 may be platinum or platinum aluminide, or other chemistries recognized by those skilled in the art. A TBC layer 34 may be deposited over bond coat layer 32. A layer 36 comprising a TBC composition and a catalytically active material may be codeposited over layer 34 or directly onto bond coat layer 32.

Figure 3:
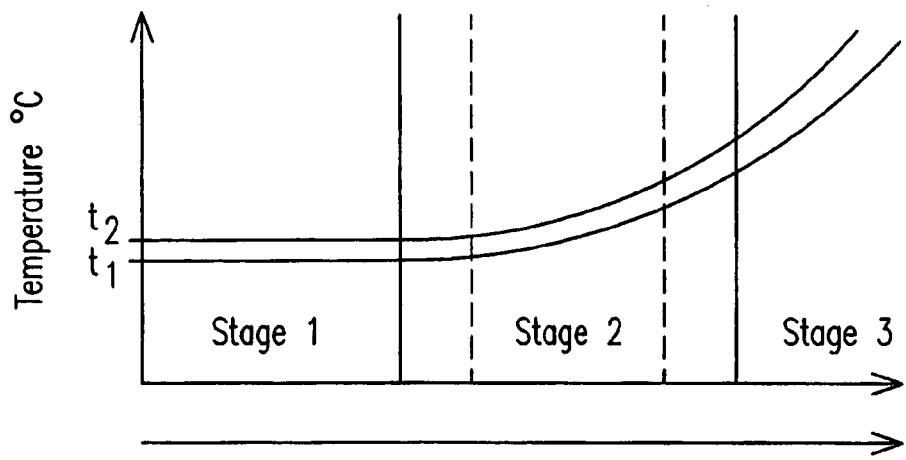
FIG. 3 is a graph illustrating a temperature profile during catalytic combustion.
Figure 4:
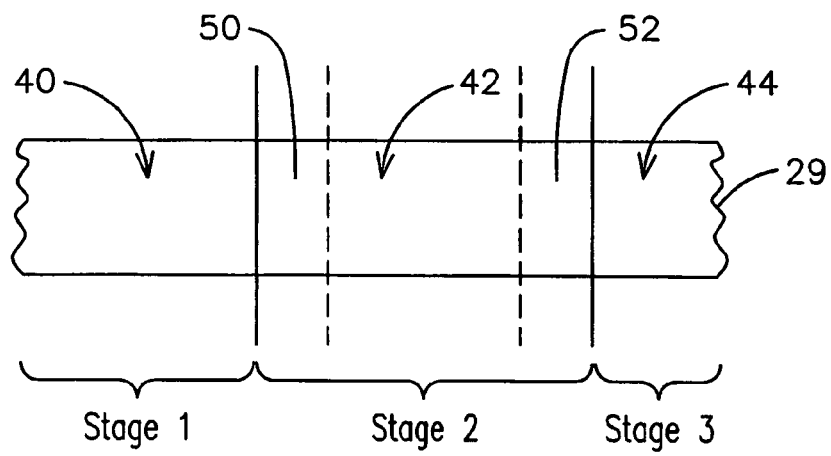
FIG. 4 is a plan view of the substrate of FIG. 2.

FIG. 3 illustrates an exemplary temperature profile over three stages of catalytic combustion within a combustor 10. Each stage may experience a surface temperature range between approximately $t_1$ and $t_2$ due to the relatively turbulent reaction occurring in the combustor and flame front fluctuations inherent in combustion flow. The stages shown in FIG. 3 are associated with respective surface areas of coating system 29 shown in FIG. 4. In this respect, coating system 29 may be located in a combustor experiencing the temperature profile of FIG. 3. FIGS. 3 and 4 illustrate an association between the stages of catalytic combustion and a respective coating that may be applied to each respective surface area in accordance with the invention.

In an exemplary combustion environment, the temperature in stage 1 may be a relatively low temperature in the range of zero to about 500° C. Catalytically active materials such as platinum or palladium oxide may be deposited on the respective surface area 40 of substrate 30 associated with stage 1. Platinum and palladium oxide are suitable for the relatively low light off temperatures of stage 1 and may be deposited on at least a portion of surface area 40 as a wash coat. Stage 2 of catalytic combustion may be between about 500° C. and 800° C. and have an intermediate light off temperature or temperatures. Various combinations of TBC composition and catalytically active materials may be codeposited on respective surface area 42 of substrate 30 associated with stage 2. Stage 3 of catalytic combustion may be about 800° and higher where a leaner fuel mixture is typically used and expected to have a relatively high light off temperature. At least a portion of respective surface area 44 of substrate 30 associated with stage 3 may be coated with catalytically active materials suitable for relatively high light off temperatures such as a stand-alone TBC layer 34. In one aspect, the light off temperature of the coating or coatings to be deposited on substrate 30 may be directly proportional to respective portions of the temperature profile shown in FIG. 3.

In exemplary embodiments of the invention the surface area of substrate 30 may be codeposited with various combinations of TBC and catalytically active materials to achieve coating surfaces with customized or tailored light off temperatures. This allows for efficient catalytic combustion as $t_1$ and $t_2$ increase over the length of substrate 30. For example, a first portion 50 of surface area 42 may have codeposited thereon a combination of TBC and catalytic material tailored to allow for efficient catalytic combustion as the temperature profile transitions from stage 1 to stage 2. A first portion 50 may have a relatively high volume fraction of catalytically active material having a relatively low light off temperature and a relatively low volume fraction of TBC composition, which has a relatively high light off temperature. The relative volume fractions of catalytic and TBC composition may be controlled through their respective weight fractions such as when the materials are mixed in powder form for codeposition on substrate 30. The relative weight fractions may be apportioned so that they correspond with respective surface area fractions of the deposited material. For example, a mixed powder by weight fractions of 98 percent low light off catalytic material and two percent TBC composition may be codeposited on first portion 50 so that approximately 98 percent of its surface area is active with the catalytic material and approximately two percent with the TBC composition. This provides first portion 50 with a first light off temperature intrinsic to the catalytic material and a second light off temperature intrinsic to the TBC composition. The relative volume fractions may also be controlled by use of separate deposition sources for each material such as multiple spray guns or a CVD source in combination with a spray gun, for example.

Figure 5:
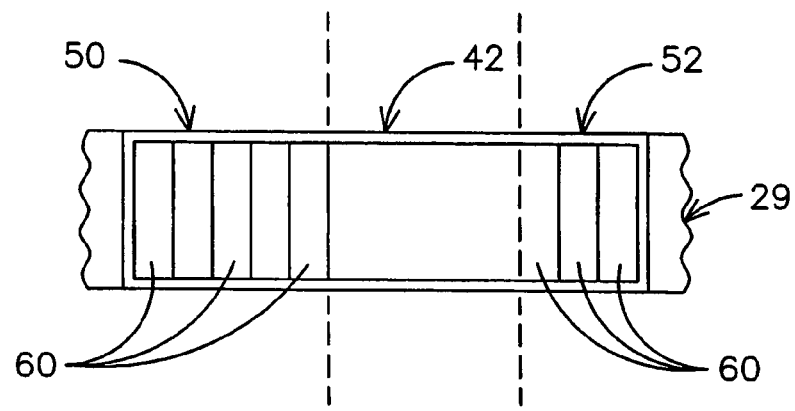
FIG. 5 is a portion of the substrate of FIG. 4.

In one aspect of the invention the relative surface area percentages of the catalytic and TBC compositions may change across a respective surface area 40, 42, 44 of substrate 30. For example, the relative surface area percentages of catalytic and TBC compositions may change at a controlled rate as a function of an increasing temperature of the temperature profile over the first portion 50 of surface area 42. This rate of change may be directly proportional to the rate of change of the temperature profile. The surface area percentage of low light off catalytic material may decrease at a rate proportional to a rate of increase in the temperature profile. FIG. 5 illustrates a segment of coating system 29 that may be associated with stage 2 combustion. In an embodiment of the invention first and/or second portions 50, 52 may be banded into segments 60 having different relative surface area percentages of catalytic and TBC compositions codeposited thereon. This banding may form a discrete gradient of relative surface area percentages of catalytic and TBC composition across first and/or second portions 50, 52. The respective surface area percentage of low light off material may decrease relative to the percentage of a higher light off material from one segment 60 to the next as the temperature profile across first portion 50 increases. This exposes fuel moving across substrate 30 to an increasing surface area percentage of higher light off material as the temperature profile across first portion 50 increases, which increases combustion efficiency. Second portion 52 may be similarly banded as a function of the temperature profile associated with that portion. Grading the relative surface area percentages over first and/or second portions 50, 52 may also reduce the cost of depositing a coating by minimizing the quantity of low light off materials such as palladium or platinum, which are relatively expensive.

Optimizing the relative surface area percentages of catalytic and TBC compositions over portions of substrate 30 may reduce the overall length of catalytic combustor 10 thereby reducing manufacturing and operating costs. Surface area 42 may have codeposited thereon relative quantities of a TBC composition and a catalytic material suitable for stage 2 combustion such as one selected from the group of hexaluminates. It will be appreciated that alternate embodiments allow for the relative surface area percentages of catalytic and TBC compositions to vary over substrate 30 as a function of an associated surface temperature profile of a combustor 10 as well as other performance requirements of a coating such as light-off temperature, surface temperature limits and durability requirements. In this respect, the relative surface area percentages of catalytic and TBC compositions may be constant across portions of substrate 30 or change from one portion to another empirically or as a step function, for example.

One aspect of the invention allows for controlling the thickness of TBC layer 34 and/or of the TBC combined with a catalytic material layer 36 during their respective depositions. The relative thicknesses of layers 34, 36 shown in FIG. 2 may be a function of various factors such as the performance requirements of a deposited or resultant coating and/or operating parameters of the combustion environment. One factor may be the durability of the resultant coating, which may be determined by cyclic furnace testing or high temperature ceramic strain testing. Durability may be expressed as the rate at which a TBC coating experiences spalling, erosion, sintering, loss of catalytic activity or other materials property degradation while in use. In one aspect a TBC and catalytic material may be codeposited as layer 36 to a first thickness so that "fresh" or active catalytic material is continuously exposed as the TBC coating experiences spalling, for example. This ensures that catalytically active material is continuously exposed during combustion operations. The first thickness of layer 36 may also be a function of the predicted useful life of the TBC and catalytic material layer 36 in a combustion environment and/or the rate at which a catalytic material deactivates at temperature during combustion. One embodiment allows for catalytic material to be codeposited with TBC composition directly onto bond coat layer 32 or substrate 30. In such an embodiment a pure or stand-alone TBC layer 34 may not be needed because the TBC composition and catalytic material layer 36 provides substrate 30 with sufficient thermal protection. The relative quantities of TBC composition and catalytically active material codeposited to form layer 36 may be constant across the thickness or depth of layer 36, or it may vary such as by a function of the rate at which layer 36 is subjected to spalling, eroding or other wear.

The target surface temperature of a resultant coating is a factor that may be used for determining the relative thicknesses of layers 34, 36, relative quantities of TBC composition and catalytic material, and the specific TBC and catalytic materials to be codeposited. The surface temperature of layer 36 during combustion is a function of the thermal gradient that is drawn through TBC layer 34. This thermal gradient is a function of the heat transfer coefficients and thermal conductivity of materials used in coating system 29. Selecting the materials to be used in coating system 29 and/or controlling the relative thicknesses of layers 34, 36 allow for a surface temperature of layer 36 to be equal to or greater than a target light off temperature. The heat transfer coefficient and thermal conductivity of layer 36 may be controlled by varying the specific TBC composition and/or catalytic material used during that layer's codeposition. This allows for controlling that layer's surface temperature and light off temperature. The thickness of a TBC composition layer may be controlled to achieve an associated surface temperature of that layer such as when depositing a stand-alone TBC layer for stage 3 combustion.

In an exemplary embodiment a first layer 34 of TBC composition may be deposited on bond coat layer 32 to a first thickness of approximately 8 mils and a second layer 36 of TBC composition and catalytic material may be codeposited on first layer 34 to a second thickness of approximately 2 mils. These exemplary thicknesses may ensure a sufficient quantity of first layer 34 remains for continued operations in a requisite combustion environment in the event the second layer 36 is exhausted through wear, spalling or otherwise degrades or comes off. An alternate embodiment allows for the first thickness to be approximately 2 mils and the second thickness to be approximately 8 mils. These exemplary thicknesses may ensure that catalytically active material is continuously exposed for combustion in a requisite combustion environment as second layer 36 spalls, erodes or otherwise erodes during combustion operations. It will be appreciated that the first and second thicknesses may vary relative to each other as a function of coating and combustion factors recognized by those skilled in the art.

Aspects of the invention allow for codepositing TBC composition and catalytically active materials to form a catalytically active coating such as layer 36 shown in FIG. 2. Exemplary catalytic materials may include noble elements, such as rhodium, iridium, palladium and platinum, as well as materials selected from the group known in the art as hexaluminates. The catalytically active layer 36 may be deposited using a combination of TBC compositions and catalytic materials that may be codeposited in mixed powder form using a single deposition process or a combination of processes and/or spray guns, for example. The deposition process or processes may be controlled to deposit layer 36 having unique or tailored light off temperatures. Catalytic combustion from such light off temperatures may be achieved by controlling properties of the materials during deposition. In this respect, catalytic combustion may be obtained with respect to the intrinsic properties of the TBC material, the catalytically active material or from various combinations of interactions among these materials during deposition. Tailored light off temperatures may be achieved from bulk and micro materials interactions during deposition. These interactions lead to unique catalytic system behavior when exposed to a combustion environment. The following examples of catalytic combustion may be obtained by controlling an associated codeposition process or processes for codepositing a TBC composition and a catalytic material:

1) Noble metal catalytic combustion intrinsic of its reduced state.
2) Noble metal catalytic combustion intrinsic of its oxidized state.
3) Mixed oxide catalytic combustion intrinsic of newly formed phases of mixed oxides of noble metal and a TBC composition that form during deposition.
4) TBC oxide catalytic combustion intrinsic to the TBC composition.
5) Catalytic combustion due to multiple phases present from combinations of multiple deposition interactions, i.e., combinations of 1) through 4) present.

A phase is a chemically or physically distinct or unique region of a deposited layer defined by a mixture of a TBC composition and/or a catalytic material. Different phases and relative volume or surface area fractions of deposited materials may be obtained by controlling deposition processes yielding the above types of catalytic combustion.

Light off temperatures may be tailored for specific applications by using various combinations of deposition processes, such as the above, and material to be deposited. A TBC composition having a first light off temperature may be codeposited with a catalytic material such as a noble metal palladium or platinum in its reduced or metal state having a second light off temperature intrinsic to its reduced state. This may result in layer 36 comprising the first and second light off temperatures. Alternatively, a codeposition process may be controlled so that at least a portion of the noble metal oxidizes during flight to produce palladium or platinum oxide, for example, having a third light off temperature intrinsic to its oxidized state. This may result in layer 36 comprising the first, second and third light off temperatures or the first and third light off temperatures if all or substantially all of the noble metal oxidizes during flight.

Alternate embodiments allow for controlling a deposition process, such as vapor phase deposition, for codepositing a TBC composition and catalytic material such as a noble metal or a hexaluminate. Other deposition processes may be used depending on the materials being deposited such as depositing a TBC composition and a hexaluminate using a thermal spray process. Controlling the deposition process allows for causing respective portions of the TBC composition and catalytic material to interact during deposition to form a unique phase of material and a unique light off temperature associated with a unique chemistry of that phase. The unique chemistry may form a phase or phases of the deposited layer having the unique light off temperature. In this respect, layer 36 may have one or more phases where each phase defines a tailored or unique light off temperature. A tailored light off temperature may also be obtained with a TBC oxide that is intrinsic to the TBC composition. It will be appreciated that various combinations of the above may be used to achieve a range of tailored light off temperatures.

The codeposition of TBC composition and catalytically active materials may be controlled by adjusting operational parameters of one or more deposition processes in accordance with the invention. Operational parameters may include, among others that will be recognized by those skilled in the art, the carrier gas velocity, the feed rate of feedstock, particle size, the port diameter, the angular location of the feedstock port with respect to the spray jet, the angle of feedstock injection in relation to the Z axis, axial injection, powder injection downstream or upstream, multiple injection sites, annular injection, concentric injection or other operational parameters associated with the design of feedstock introduction. Additionally, the heat source settings may determine the maximum, mean and distribution of particle temperature. The flow rates of combustion or plasma gases and the geometry of a spray torch exit nozzle may determine the maximum, mean and distribution of particle velocity.

A typical EB-PVD deposited TBC composition has a columnar structure that develops from the vapor deposition process. It has been determined by the inventors of the present invention that codepositing a catalytically active material, such as a noble metal, with a TBC composition allows for an atomic ordering of the noble metal within the lattice of the deposited material. This may be referred to as substitutional alloying. Infiltration of the columns with a catalytically active material imparts the light off temperature of the infiltrating material on the coating system such as in layer 36 of a system 29 shown in FIG. 2.

The inventors of the present invention have also determined that APS may be used to deposit TBC compositions that incorporate various amounts of noble metallics into the deposited structure. For example, a noble metal may be codeposited within a thermally sprayed ceramic TBC. The amount of noble metal sprayed may be changed relative to the amount of TBC composition to achieve the desired presence of noble metal. Interactions within the spray process by the molten droplets of noble metal and TBC composition may change the structure of certain deposited material leading to unique intrinsic light off temperatures.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A catalytically active coating for use in a combustion environment, the coating comprising:
    a first layer comprising a TBC composition having a first light off temperature and a catalytic material having a second light off temperature; and
    a gradient of relative surface area percentages of the TBC composition and the catalytic material over at least a portion of a length of the first layer, wherein a relative surface area percentage of the TBC composition increases and a relative surface area percentage of the catalytic material decreases in a downstream direction over at least a portion of the length of the first layer.

2. The coating of claim 1 wherein a portion of at least one of the TBC composition and the catalytic material is in an oxidized state producing a third light off temperature different from the first light off temperature or the second light off temperature.

3. The coating of claim 1, the TBC composition comprising yttrium-stabilized zirconia and the catalytic material comprising a noble metal.

4. The coating of claim 1, the first layer further comprising an oxidized state of at least one of the TBC composition and the catalytic material having a third light off temperature.

5. The coating of claim 1, wherein the gradient comprises a plurality of segments, each segment having an increasing surface area percentage of the TBC composition and a decreasing surface area percentage of the catalytic material relative to a previous segment in a downstream direction along at least a portion of the length of the first layer.

6. The coating of claim 1, wherein the first layer further comprises a phase of oxidized catalytic material having a light off temperature for use in a stage of combustion between about 500 and 800 degrees Celsius.

7. The coating of claim 1, the first layer further comprising a mixed oxide phase comprising an oxide of the TBC composition and an oxide of the catalytic material having a light off temperature different than respective light off temperatures of the TBC composition and the catalytic material.

8. The coating of claim 1, the first layer further comprising a varying percentage of the catalytic material through a thickness of the first layer.

9. A catalyst element comprising:
    a substrate, wherein the substrate is at least one of an alloy material and a ceramic material; and
    a first layer comprising a TBC composition and a catalytic material throughout its depth disposed over a first portion of the substrate, wherein the catalytic material is at least one of a noble element and a hexaluminate.

10. The catalyst element of claim 9 further comprising a second layer consisting of a catalytic material disposed over a second portion of the substrate.

11. The catalyst element of claim 10 further comprising a third layer consisting of a TBC composition disposed over a third portion of the substrate.

12. The catalyst element of claim 9, the first layer further comprising a gradient of respective surface area percentages of the TBC composition and the catalytic material disposed over a length of the first portion of the substrate, wherein a relative surface area percentage of the TBC composition increases and a relative surface area percentage of the catalytic material decreases in a downstream direction over at least a portion of the length of the first layer.

13. The catalyst element of claim 12, Wherein the gradient comprises a plurality of segments, each segment having an increasing surface area percentage of the TBC composition and a decreasing surface area percentage of the catalytic material relative to a previous segment in a downstream direction along at least a portion of the length of the first layer.

14. The catalyst element of claim 9, the first layer further comprising a phase of oxidized catalytic material having a light off temperature for use in a stage of combustion between about 500 and 800 degrees Celsius.

15. The catalyst element of claim 9, the first layer further comprising a mixed oxide phase comprising an oxide of the TBC composition and an oxide of the catalytic material having a light off temperature different than respective light off temperatures of the TBC composition and the catalytic material.

16. The catalyst element of claim 9, the first layer further comprising a varying percentage of the catalytic material through a thickness of the first layer.

17. The catalyst element of claim 9 further comprising a TBC composition layer without a codeposited catalytic material disposed between the substrate and the first layer.

18. The catalyst element of claim 9, the TBC composition comprising yttrium-stabilized zirconia and the catalytic material comprising a noble metal.

* * * * *